Dec. 7, 1965 J. H. TWEET 3,221,495
THRUST CUT-OFF AND THRUST REVERSAL SYSTEM
Filed March 28, 1960
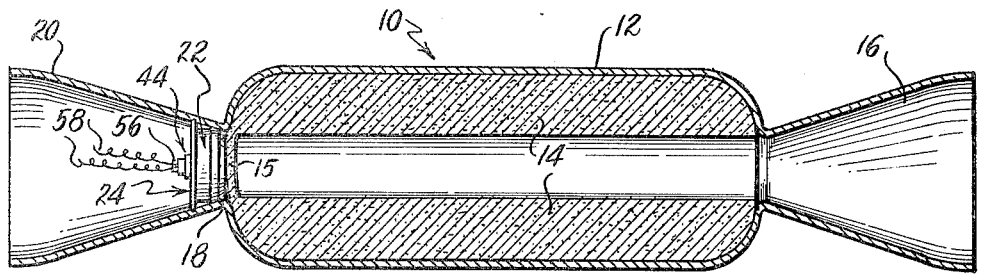
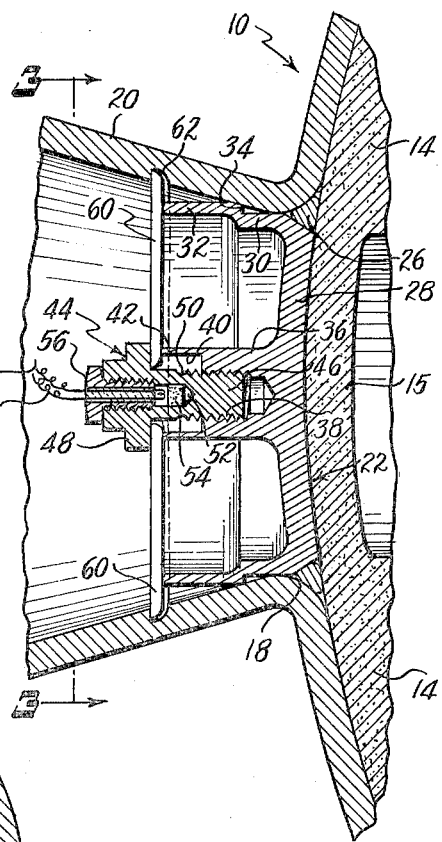
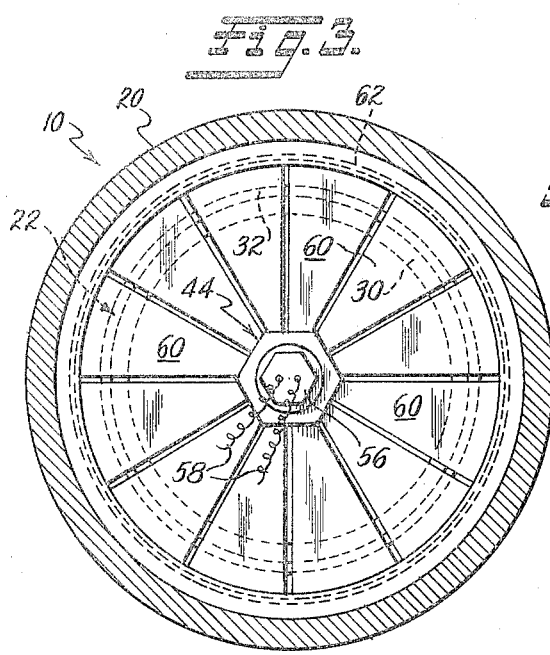
INVENTOR.
John H. Tweet
BY
Raymond W. Colton
ATTORNEY

United States Patent Office 3,221,495
Patented Dec. 7, 1965

3,221,495
THRUST CUT-OFF AND THRUST REVERSAL SYSTEM
John H. Tweet, Tolland, Conn., assignor to United Aircraft Corporation, East Hartford, Conn., a corporation of Delaware
Filed Mar. 28, 1960, Ser. No. 18,103
6 Claims. (Cl. 60—35.6)

This invention relates broadly to pressure responsive closures for openings in pressure vessels which may be remotely operated to permit the pressure release therefrom, and more specifically to a thrust cut-off and thrust reversal apparatus employing such a closure.

In controlling the trajectory of rockets or guided missiles or vehicles employing rockets as a propulsion means, it is often necessary to utilize some means for rapidly reducing or eliminating the rocket thrust when desired, and to also provide a reverse thrust on the rocket to assist in jettisoning individual stages of multistage rockets.

The problem of achieving a desired trajectory for a guided missile is complex. It is well known, for example, that a guided missile will follow a definite trajectory most easily if the forward thrust of the rocket motor can be terminated, when desired, at a specific instant. This presents no difficult problem in rockets utilizing liquid fuel, in which the thrust can be reduced or even eliminated by control of the fuel supply. However, in the case of rocket motors utilizing solid fuel, the solution is not so simple.

Solid propellant type rockets, when once ignited, will ordinarily continue to burn and produce thrust until the propellant charge is consumed. The rate of combustion, to a certain degree, is a function of the internal pressure, in that an increase in pressure effects an increased rate of combustion. On the other hand, if some means is provided to reduce the pressure within the rocket motor combustion chamber below a certain critical low value, the chemical combination or combustion ceases and thrust cut-off takes place.

This invention is principally applicable to solid propellant type rocket motors as a means of providing a controlled thrust cut-off and thrust reversal. In its broader aspects, however, it is also applicable in situations where a remotely controlled, quick opening, valve or closure is desired, such as in the release of pressure in vessels containing a fluid under pressure.

It is an object of the invention, therefore, to provide a novel valve or closure for a pressure vessel which may be remotely controlled to permit the quick release of pressure.

It is further object to provide, in a reaction propulsion motor having a main nozzle, a novel remotely actuated means to provide a neutralizing force to overcome the thrust of the main nozzle which will operate with a minimum disturbance on the desired trajectory.

It is a further object to provide, in a reaction propulsion motor having a forward thrust nozzle, a normally closed reverse thrust nozzle which can be remotely controlled to an open operative position.

It is a still further object to provide, in a reaction propulsion motor having a thrust nozzle, a novel closure capable of being remotely actuated to a released condition, in which the closure and a retainer therefor do not require the modification of the nozzle structure to the extent of interfering with the smooth flow of gases therethrough.

It is a still further object to provide, in connection with an opening in a pressure vessel, a novel closure and closure retainer, in which a small, remotely fired, explosive charge is required to release the retainer to permit the pressure within the vessel to remove the closure.

The attainment of the above and of other objects will become more apparent from a consideration of the following specification in connection with the drawings forming a part of the disclosure, in which:

FIG. 1 is a sectional view through a reaction propulsion motor employing the novel closure and retainer in an auxiliary nozzle;

FIG. 2 is an enlarged detail view of one end of the reaction propulsion motor of FIG. 1; and FIG. 3 is an end view of FIG. 1, looking toward the left, showing the details of the retaining means.

Referring to the drawings, the reference numeral 10 indicates a vessel having a fluid under pressure in the form of a rocket motor having a combustion chamber 12 containing a solid propellant 14, which may be ignited by conventional igniting means to generate gases under pressure. These gases are permitted to escape through a main thrust nozzle 16 in the rear end to produce a forward thrust on the rocket motor as is well known in the art.

An opening 18 is provided in the forward end of the rocket motor, which opening has the same diameter as the opening for the thrust nozzle 16. An auxiliary or second thrust nozzle 20 is connected to the opening 18 to receive fluid flow from the combustion chamber 12. Nozzle 20 is identical in construction with the main nozzle 16, and the axis thereof is coaxial with the axis of the main nozzle so that, when the gases within the combustion chamber 12 are permitted to escape through both nozzles 16 and 20, their reaction thrusts will be equal. As the gases from these nozzles discharge in opposite directions, their thrusts will be opposed, and there will be no resultant thrust effective on the rocket motor to produce a movement thereof in any direction.

The opening 18 is normally closed by a closure 22 in the form of a plug which may be inserted through the outer end of the nozzle 20. The closure is held in place at the throat of the nozzle 20 by a retaining means 24. A seal 26, made of a suitable material which will resist the high temperatures within the combustion chamber 12, is provided between the closure and the opening 18 to prevent the leakage of gases.

The closure includes a concave head 28 conforming to the contour of the inner wall of the combustion chamber surrounding the opening, and a skirt 30 having an external diameter to fit snugly, but without undue friction, within the throat of the nozzle 20. The outer end of the skirt 30 is enlarged by a radially extending shoulder 34 and continues axially outwardly in the form of a second skirt 32 having an external diameter somewhat larger than the first skirt 30, whereby the junction of the second skirt and the shoulder 34 provides a snug fit within the expanding portion of the nozzle, as more clearly shown in FIG. 2. A boss 36 extends axially away from the head 28, and is provided with a threaded bore 38. The outer end of the bore 38 is counterbored at 40, whereby the outer end of the boss forms an axially extending annular skirt 42. The outer end of the annular skirt 42 lies in the plane of the outer end of the skirt 32 and is concentric therewith.

A hollow, explosive, bolt 44 is screwed into the threaded bore 38. The bolt 44 includes a threaded shank 46 and a head 48 of hexagonal form for engagement by a suitable tool, such as a wrench. The outer portion of the shank 46 need not be threaded, and a weakened section 50, in the form of an external, annular, groove is provided in the shank between the threaded portion and the head for a purpose to be set forth hereinafter. The outer end of the shank, and the head 48 of the bolt, are bored at 52, which bore extends past the weakened section 50. The outer end of the bore is threaded to receive a threaded igniter plug 56 to which is attached a pair of electrical conductors 58. An explosive charge 54 is placed within the bore 52, after which the threaded igniter plug 56 is screwed into place.

The closure is held in position by the retaining means 24, which comprises a plurality of sector pieces 60. These sector pieces are arranged in a circle, with their outer ends engaged within a stop in the form of an annular recess 62 formed within the inner wall of the nozzle. The recess 62 is located well downstream of the critical throat region of the nozzle, where it will cause only a minimum flow disturbance. The inner ends of the sector pieces are held against the outer edge of the skirt 42 by the head 48 of the explosive bolt 44, while an intermediate portion of the sector pieces engages the outer edge of the second skirt 32, thereby retaining the closure within the opening 18 against the pressure of the gases within the combustion chamber 12.

With the rocket motor assembled as shown in the drawings, the solid propellant may be ignited, and the gases will escape through the main nozzle 16 to provide a forward thrust to propel the rocket motor, and any load which may be connected to it.

Solid propellant type rocket motors, when once ignited, ordinarily continue to burn and to produce thrust until the propellant charge is consumed. However, if the pressure within the combustion chamber is reduced below a certain critical value, the combustion ceases and thrust cut-off is accomplished. Advantage is taken of this fact to reduce thrust by removing the closure when desired and thereby quickly reducing the presure within the combustion chamber. It is often necessary, in controlling the trajectories of rocket motors, to rapidly cut off the thrust and/or also to provide a reverse thrust to aid in jettisoning individual stages of multistage rocket motors, or to control the trajectory.

The conductors 58 may be connected to some remotely controlled signalling device which may be made operative by a radio signal or by a time controlled element. When made operative, an electric current energizes the igniter carried by the threaded igniter plug 56 to explode the charge 54. The explosion breaks the bolt 44 along the weakened section 50, allowing the head 48 to fly off and release the inner ends of the sector pieces 60. The pressure of the gases within the combustion chamber 12 then become effective to force the closure, seal 26, and sector pieces 60 through the outer end of the auxiliary or second nozzle 20. The nozzle 20 then becomes operative, and the gases escape therefrom to produce a thrust which is equal in force but is opposite in direction to the force produced in the main nozzle 16. This reverse force nullifies the effectiveness of the forward thrust of the main nozzle, thereby quickly stopping the acceleration or the forward driving force on the motor, and also rapidly reducing the pressure within the combustion chamber below the critical value for continued combustion.

The concave face of the closure is covered with a layer of insulation. This may be some well known form of non-combustible material, but is shown as a layer of solid fuel 15, which provides sufficient heat insulation. This compacted solid fuel has no substantial strength, so that the pressure within the combustion chamber could easily blow out the closure if any unburned fuel covered it.

While a plurality of sector pieces have been illustrated, it is evident that a fewer number, or even a single sector piece could be employed under certain conditions. It is also evident that the closure could be employed in connection with other forms of pressure vessels by inserting it within a passage connected with an opening in the vessel. It is further evident that, where only pressure reduction within a rocket motor is desired, the nozzle 20 may be omitted, or the nozzle 20 may be directed in any direction, or that more than one closure-controlled nozzle may be provided.

An advantage of the arrangement described above is that only a relatively small charge is sufficient to break the bolt, thereby resulting in a considerable saving in weight. The pressure within the pressure vessel is sufficient to force the closure, seal, and retaining means quickly from the passage or nozzle, thereby producing a quick thrust reversal and/or reduction of pressure. The location of the relatively small stop or recess well downstream of the nozzle assures a minimum flow disturbance, and does not interfere with the flow through the critical throat region. Furthermore, all parts of the plug or closure assembly are accessible from the outside of the rocket motor, and may be removed at any time for inspection or for replacement of parts.

While only a single embodiment of the invention has been illustrated, it is to be understood that other embodiments would be obvious to persons skilled in the art as comprehended within the scope of the attached claims.

I claim:

1. A reaction propulsion motor, comprising: a combustion chamber having a solid fuel therein which is adapted to be burned for the generation of hot gases under pressure; a thrust nozzle connected with said combustion chamber receiving the discharge of gases to provide a thrust; an opening in the wall of said combustion chamber; a closure covering said opening preventing the escape of gases therefrom, said closure having a surface forming a part of the combustion chamber wall; a part of said solid fuel covering said surface and serving as a heat insulator; retaining means associated with said closure and operative to retain the closure in closed position; and remotely controlled means connected to said retaining means to render the same inoperative and permit the pressure of the gases within the combustion chamber to force the closure from the opening to relieve the pressure within the combustion chamber.

2. A pressure release device for use in a pressure vessel having an opening for the escape of fluid under pressure, said opening including a recess, comprising: a closure adapted to be fitted within the opening; retaining means, for preventing the pressure of the fluid within the vessel from forcing the closure from the opening, said retaining means including a plurality of elongated members, one end of each member being adapted to be received within the recess in the opening and the other ends of said members, when said one ends are disposed in said recess, being in closely spaced relation to each other at the center of the opening; and a headed explosive bolt threadedly engaging said closure, the head of said bolt engaging and retaining said closely spaced ends of said members against said closure whereby firing of said explosive bolt results in the complete removal of said closure and said retaining means from the opening by the pressure within the pressure vessel.

3. A pressure release device for use in a reaction propulsion motor having a combustion chamber for the generation of gases under pressure and a divergent thrust nozzle connected with said combustion chamber, the inner wall of said nozzle including a stop, said device comprising: a closure adapted to be received within said nozzle upstream of the recess, said closure having an axial threaded bore; retaining means, for preventing the pressure within the combustion chamber from forcing the closure from the nozzle, said retaining means including a plurality of sector pieces, one end of each sector piece adapted to engage said stop, the other ends of said sector pieces being disposed in closely spaced relation with each other about the longitudinal axis of the nozzle; and a headed explosive bolt threadedly engaging said axial threaded bore, the head of said bolt engaging and retaining said closely spaced ends of said sector pieces against said closure, whereby upon firing of said explosive bolt, the pressure of the gases within the combustion chamber completely removes said closure and said retaining means from said nozzle.

4. A pressure release device as defined in claim 3, in which said closure includes an axially extending central boss, said axial threaded bore being provided within said boss, and in which said bolt head retains said closely spaced ends of said sector pieces against said boss.

5. A pressure release device as defined in claim 3, in which said closure includes a head and a peripheral, axially extending, skirt and a central axially extending boss, said axial threaded bore being provided in said boss, in which the end of the skirt engages the sector pieces intermediate their ends and said bolt head retains said closely spaced ends of said sector pieces against said boss.

6. A pressure release device as defined in claim 3, in which said closure includes a head and a peripheral skirt means, said skirt means extending in an axial direction and comprising a first skirt connected at one end with the closure head, and a second skirt of greater diameter than said first skirt connected with the other end of said first skirt, portions of the external surfaces of said first and second skirts engaging the inner wall of said nozzle upstream of said stop, and a central axially extending boss connected with said head, said axially threaded bore being provided in said boss, in which the downstream end of said second skirt engages the sector pieces intermediate the ends of the latter and said bolt head retains the spaced ends of said sector pieces against said boss.

References Cited by the Examiner
UNITED STATES PATENTS

| | | | |
|---|---|---|---|
| 2,457,839 | 1/1949 | Skinner | 102—49 |
| 2,627,160 | 2/1953 | MacDonald | 60—35.6 |
| 2,720,749 | 10/1955 | Beebe | 60—35.6 |
| 2,776,623 | 1/1957 | Bonner | 60—35.6 X |
| 2,850,976 | 9/1958 | Seifert | 102—49 |
| 2,943,445 | 7/1960 | Ritterskamp et al. | 60—39.09 |
| 2,952,972 | 9/1960 | Kimmel et al. | 60—35.6 |
| 3,135,416 | 6/1964 | Royer | 220—47 |

MARK NEWMAN, *Primary Examiner.*

SAMUEL LEVINE, JULIUS E. WEST, *Examiners.*